May 19, 1942.  H. C. ERDMAN  2,283,494

METHOD OF MAKING SCREW AND WASHER ASSEMBLIES

Filed July 23, 1940  2 Sheets-Sheet 1

INVENTOR.
HARVEY C. ERDMAN
BY Kwis Hudson & Kent
ATTORNEYS

May 19, 1942.   H. C. ERDMAN   2,283,494

METHOD OF MAKING SCREW AND WASHER ASSEMBLIES

Filed July 23, 1940   2 Sheets-Sheet 2

INVENTOR.
HARVEY C. ERDMAN
BY
Kwis Hudson & Kent
ATTORNEYS

Patented May 19, 1942

2,283,494

UNITED STATES PATENT OFFICE 2,283,494

METHOD OF MAKING SCREW AND WASHER ASSEMBLIES

Harvey C. Erdman, Shaker Heights, Ohio, assignor to The National Screw & Manufacturing Company, Cleveland, Ohio, a corporation of Ohio Application July 23, 1940, Serial No. 346,965

10 Claims. (Cl. 80—61)

This invention relates to screw and washer assemblies and especially to certain method features thereof, the principal object of the invention being to provide a highly efficient assembly produced by a method such that it can be manufactured in large quantities at reduced cost.

At the present time these assemblies are produced by different methods each of which has certain disadvantages either from the standpoint of the assembly itself or from the standpoint of production. By one of the methods in use at the present time the washer is applied to the shank of the screw (or bolt) after which the thread is rolled on the shank and the raised portion of the rolled thread is relied upon to prevent the washer from falling off the screw. While this method is satisfactory from a cost standpoint, the assembly has several disadvantages over an assembly wherein the screw is completed before the washer is applied particularly when the screws are to be casehardened, cyanide-hardened, plated, or heat-treated as when alloy or high carbon steels are employed. These operations are virtually impossible if the washer is applied before the thread is rolled on the shank of the screw since these operations would disadvantageously affect and in some instances virtually destroy the washer. For example, the hardening process would affect the washers to an extent such that they would snap in use.

Furthermore, assemblies wherein the washer is applied before the shank is threaded have the disadvantage that the presence of the washer makes it impossible to thread the shank close up to the head for otherwise the action of the rolling dies would mutilate if not destroy the washer. Additionally, when the thread is relied on to hold the washer in place, the washer cannot be definitely positioned up against the head or close to it if a considerable portion of the length of the shank is unthreaded. This is disadvantageous for certain uses or applications which make it desirable if not necessary that the washer be retained close to the head while the screw is being applied.

By another present day method of manufacturing these assemblies, the washer is applied after the screw is completed by passing it over the thread and forcing it onto a shoulder or enlargement under the head. While this product is satisfactory for many uses, it is unsatisfactory for others because the washer is forced on so tightly that when the screw is being applied the washer turns with the screw and often mars the surface of the metal piece or other part into which the screw is being inserted. It is frequently the case that a portion of the washer extends out beyond the head, with the result that it will mar an enameled or other finished surface, and in such cases an assembly made in this manner is unsatisfactory and unsuited.

By still another method the washer is passed over the thread next to the head and is then retained in place by a so-called staking or shouldering process by which a shoulder is thrown up beyond the thread and close to the head. Although this assembly is satisfactory in the respect that the washer can turn freely on the screw and permits the screw to be plated or heat-treated and, in fact, completed except for the shouldering operation, it has the disadvantage that this process requires a separate operation to effect the staking or shouldering to retain the washer in place, and this extra operation entails additional handling of the parts and thus adds to the cost which is a matter of considerable consequence in the production of large quantities which often run into the millions.

By the present invention the washer is applied after the screw is completed including any plating, hardening or heat-treating operation to which it may be subjected, and after the washer is applied it is loose on the shank or can turn when the screw is being applied to the work and the shoulder for retaining it in place is formed without any extra operation. These results are attained by forming a retaining shoulder in the thread-rolling operation, the shoulder being of such a nature that the washer can be snapped or sprung over it and at the same time there is no danger of the washer accidentally passing over the shoulder in the opposite direction and dropping off the screw.

The invention may be further briefly summarized as consisting in certain steps of the improved method and in improved details of the assembly which will be described in the specification and set forth in the appended claims.

In the accompanying sheets of drawings.

Figure 2:
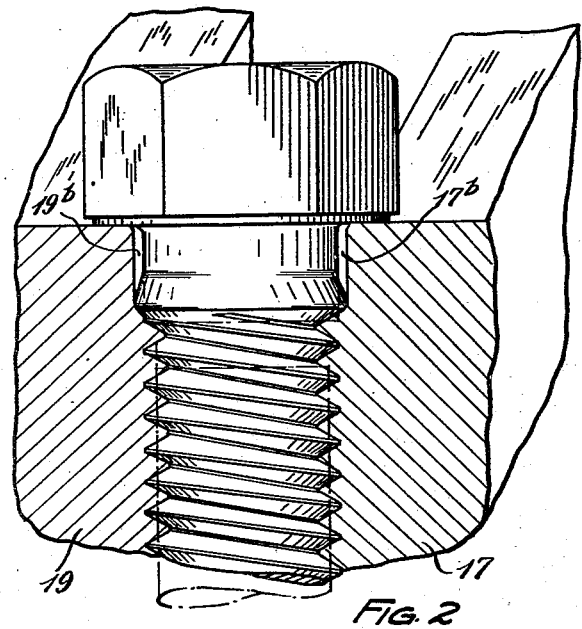
Fig. 2 shows a portion of a screw between the thread-rolling dies, the thread and the washer-retaining shoulder being shown as completed by the dies and there being shown by dotted lines the shape of the blank prior to the thread-rolling operation.
Figure 8:
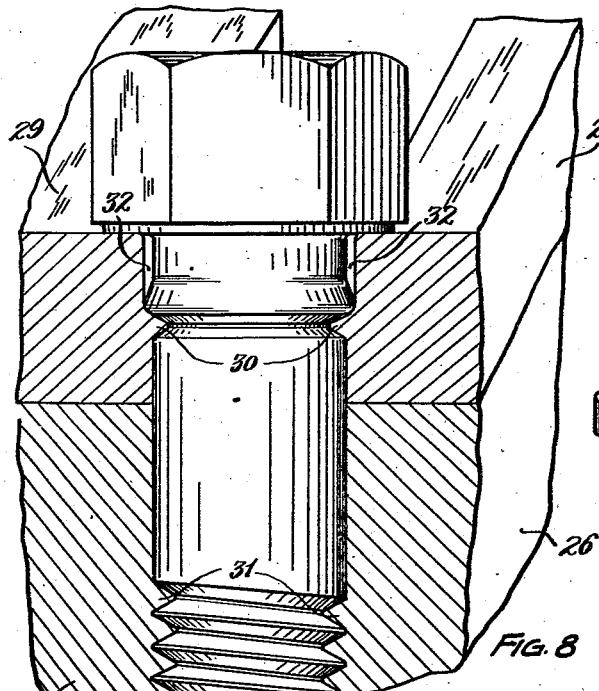
Figure 9:
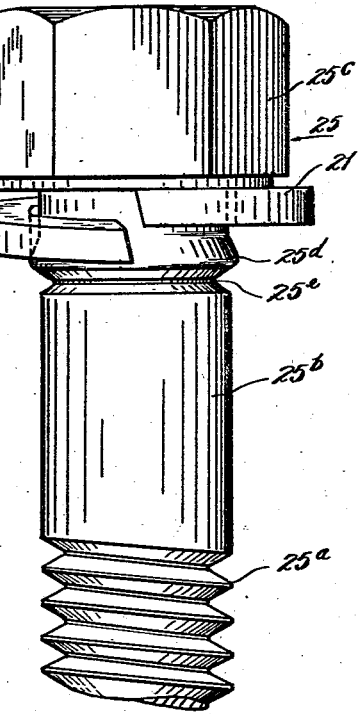

Fig. 8 is a view similar to Fig. 2 showing a modification of my invention wherein the washer-retaining shoulder is formed a distance from the end of the thread, this form of my invention being useful where the screw has a shank with a shorter thread than is shown in Fig. 2 and a relatively long unthreaded portion and when it is desired to position the washer close to the head rather than allow it to slide freely between the head and the shoulder formed at the inner end of the thread;

Fig. 9 shows the screw of Fig. 8 with the washer in place; and

Figure 10:
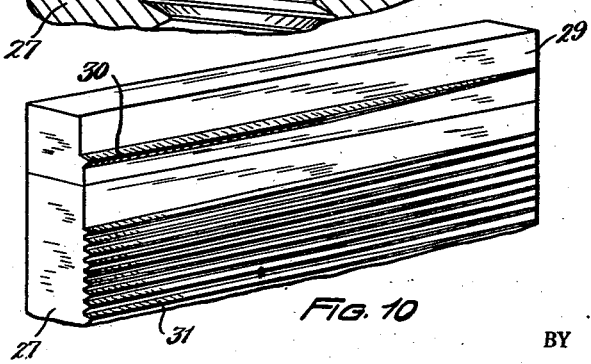

Fig. 10 is a perspective view of one of the thread-rolling dies with the part associated therewith for forming the washer-retaining shoulder in cooperation with a similar die and a like shoulder-forming rib.

Very large quantities of screw and washer assemblies are being manufactured and sold annually, but generally the major portion of these screws have a diameter on the order of ¼ inch or ⅟₁₆ inch. In the drawings much larger screws are illustrated to more clearly show the features involving the present invention. Accordingly, in practice the washer-retaining shoulder is considerably smaller than herein illustrated, it being in all instances only sufficiently high that the washer can be sprung over it and thereafter not come off accidentally but not high enough to interfere with the insertion of the screw for the full distance into the tapped opening. While my invention finds its utility in connection with the production of screws much smaller than those herein illustrated, nevertheless it is adaptable for screws of any size. My invention can also be employed in the production of screw and washer assemblies utilizing any of the standard or specially formed lock washers, and, if desired, it may be utilized with a plain washer. The washer-retaining shoulder is high enough to serve its purpose of permitting the application of the washer after the thread is formed but is not sufficiently high to prevent any kind of a washer from being passed over the thread and forced over the shoulder regardless of whether or not the washer has a continuous inner edge or periphery.

Furthermore, it is to be understood that the term "screw" as used herein is inclusive of a product which is technically a bolt, it being wholly immaterial to the present invention whether or not the threaded member is adapted to receive a nut.

Referring now to the drawings, 15 (Fig. 3) represents a typical blank such as may be formed either by an extrusion process or by an upsetting process both of which are well known. The blank has a head 15a and a portion 15b which is to be the unthreaded part of the shank and which may be of variable length, this portion having an outside diameter equal to that of the outside diameter of the threaded portion. The blank also has a reduced portion 15c on which the threads are to be rolled and generally a tapered portion 15d between the portions 15b and 15c in which portion 15d the thread ends.

Figure 1:
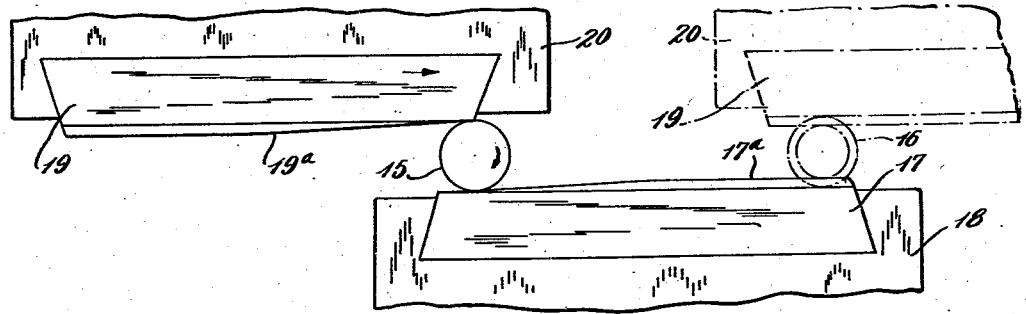
Fig. 1 is a conventional representation of the thread-rolling dies which are utilized in forming the thread on the screw and which are instrumental in forming the shoulder or ridge which acts as a retainer for the washer.
Figure 3:
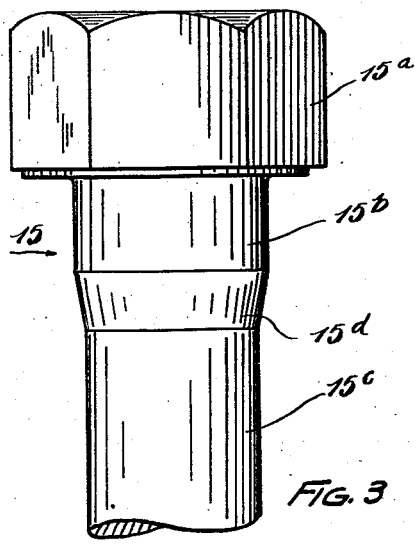
Fig. 3 is a view of the blank prior to the thread-rolling and shoulder-forming operation, a blank of this kind usually being formed from wire by an extrusion process or an upsetting process.

In forming the blank illustrated in Fig. 3, it may be provided with any desired type of head as well as any relative lengths of the portions 15b and 15c with the appropriate location of the tapered portion 15d joining them. The complete screw 16 (Fig. 4) is formed by rolling on the reduced portion 15c of the shank the thread 16a. This is accomplished by thread-rolling dies shown somewhat conventionally in Fig. 1, these dies including a stationary die 17 mounted in a stationary holder 18 and a reciprocating die 19 carried by a reciprocating die holder 20, Fig. 1 showing the blank 15 between the dies at the start of the thread-rolling operation. As is customary, the two dies 17 and 19 are provided respectively with thread-forming ribs 17a and 19a which for a distance gradually increase in height to about the middle of the die where the ribs have their full height, the ribs having the necessary lead for the angularity of the thread and having a maximum height sufficient to completely form the thread with the outside diameter of the thread equal to the outside diameter of the portion 15b of the blank. Ordinarily the thread ends in the tapered portion 15d and no change whatsoever is made in the portion 15b of the blank. In some instances the thread-rolling ribs on the two dies are of the same height and the gradual formation of the thread during the stroke of the movable die is accomplished by slightly tilting the dies in the respective holders.

In accordance with the present invention, by a slight change made in the threading dies 17 and 19 a washer-retaining shoulder 16b is thrown up or rolled during the thread-rolling operation to a diameter slightly above that of the thread and of the unthreaded portion 16c (corresponding to the portion 15b of the blank) which shoulder, as before stated, permits a washer to be sprung over it onto the unthreaded portion of the screw next to the head and is not too high for that purpose but still high enough to prevent the washer from accidentally falling off the screw.

Ordinarily, i. e., in forming screws without the washer-retaining shoulder, the distance between the flat faces of the dies extending beyond the thread-rolling ribs is equal to the diameter of the portion 15b of the blank, i. e., the portion not to be threaded. That is to say, the portions of the dies projecting beyond the thread-forming ribs are flat and the portion 15b of the blank rolls on these flat faces so that no metal whatever is thrown up beyond the tapered portion 15d of the blank. However, to bring about the formation of the washer-retaining shoulder 16b during the thread-rolling operation, it is only necessary to relieve or cut back the metal beyond the thread-forming ribs as shown at 17b and 19b (Fig. 2) so that the portions of the ribs forming the inner end of the thread will roll up the metal of the tapered portion 15d of the blank and displace it toward the head in the form of the shoulder 16b, as clearly illustrated in Fig. 2. Thus by this change in the dies the thread is rolled in the blank and the shoulder is formed in the same operation without adding anything to the cost of the finished product and without in any way adversely affecting the strength and efficiency of the screw.

Figure 4:
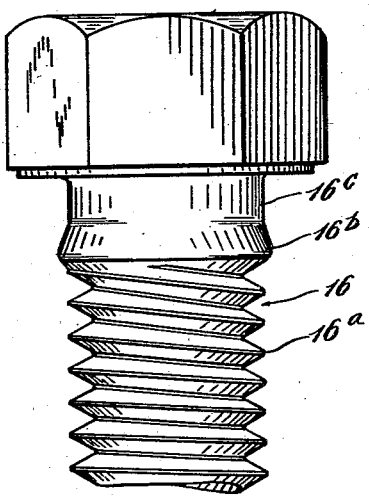
Fig. 4 shows a portion of a completed screw.
Figure 5:
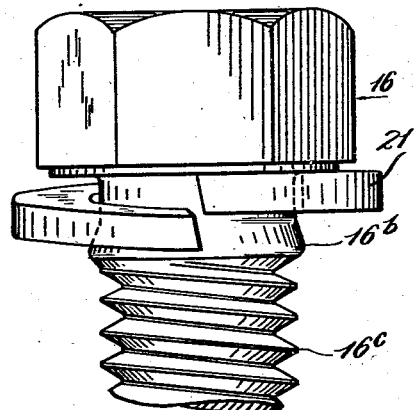
Fig. 5 is a similar view with a lock washer slipped in place over the thread and shoulder.
Figure 6:
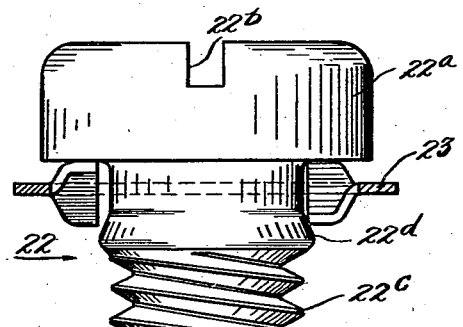
Fig. 6 is a view similar to Fig. 5 showing a toothed-type lock washer instead of the split type of Fig. 5.

In Fig. 5 I have shown a split lock washer 21 in place between the shoulder 16b and the head of the screw. In Fig. 6 I have shown a finished screw at 22, the same being similar to that shown in Figs. 4 and 5 except that in this instance the screw has a round head 22a with a screwdriver slot 22b. It also has a thread 22c and a shoulder 22d corresponding to the shoulder 16b of Figs. 4 and 5, but in this instance there is located between the head and the shoulder 22d a lock washer 23 toothed at its inner periphery. As previously stated, the split washer 21 (Fig. 5) and the toothed washer 23 (Fig. 6) are typical of a group of washers commonly employed, and other washers of standard or special shape may, if desired, be employed just as effectively as those illustrated, as, for example, washers toothed at their outer periphery and plain or continuous at their inner periphery or washers toothed at both peripheries, and plain washers which may be round or continuous at both peripheries.

Figure 7:
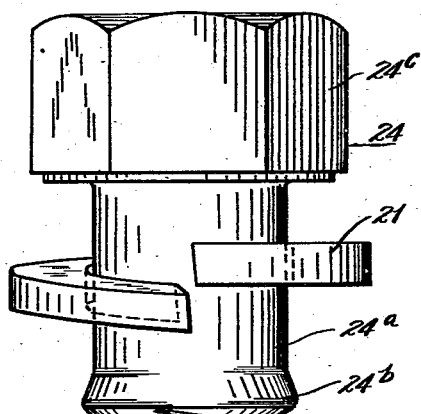
Fig. 7 is a view similar to Fig. 5 showing a screw with a split washer between the head and the shoulder but with a longer unthreaded portion between the thread and the head than is the case with the preceding views.

The screw designated 24 in Fig. 7 is similar to the screws illustrated in Figs. 4, 5, and 6 except that it has a longer unthreaded portion 24a between the head and the washer-retaining shoulder 24b, the latter being formed in precisely the same manner as the washer-retaining shoulder 22d of Fig. 6 and the shoulder 16b of Figs. 4 and 5. In this instance the washer, as in Fig. 5, is a split washer 21. In this case the washer is free (prior to and during the application of the screw to the threaded hole in the work piece) to move between the shoulder 24b and the head 24c. This is not objectionable in some instances, but, as previously stated, for certain uses where the thread is short or where the screw has a long unthreaded portion between the head and the thread it is desired that while the screw is being applied to the work piece the washer be held up close to the head.

In accordance with a modified form of my invention I am enabled during the thread-rolling operation to provide a rolled washer-retaining shoulder as close to the head as desired or at any desired distance from the inner end of the thread, and screws of this type are illustrated in Figs. 8 and 9 where they are designated 25. This screw has a thread 25a, a long unthreaded shank portion 25b between the thread and the head 25c and close to the head is a rolled washer-retaining shoulder 25d for holding in place between this shoulder and the head any desired washer, here shown as a split lock washer 21. This shoulder is formed in the thread-rolling operation by clamping in the stationary and movable die holders alongside the stationary and movable dies designated 26 and 27 respectively in Fig. 8 extensions 28 and 29 provided with shoulder-rolling ribs 30 located at the proper distance with respect to the thread-rolling ribs 31 and cooperating to form at the desired distance from the head 25c the washer-retaining shoulder 25d. These shoulder-rolling ribs 30, unlike the thread-rolling ribs, are without leads and they press or roll a groove 25e in the blank and the metal displaced in forming this groove flows in one direction, i. e., toward the head, this being accomplished by forming a relief or cutting away the metal on the inner faces of the die extensions 28 and 29 on the side of the rib 30 toward the head, this relief being designated 32 in Fig. 8. On the other side of the shoulder-forming ribs 30 of the die extensions 28 and 29 the inner faces of these die extensions engage the shank of the blank the same as the inner faces of the dies proper so that in forming the groove 25e the metal is free to flow only inwardly toward the head, as clearly indicated in Figs. 8 and 9.

By reference to Fig. 10 it will be noted that the groove- and shoulder-rolling rib 30 of the composite die, like the thread-rolling ribs 31, is of gradually increasing height from the end where the rolling operation starts to about the center of the die and then is of uniform height to the other end. This will be true of both composite dies. Of course both of the dies are similarly formed. The relief 32 of the die extensions 28 and 29 may be of uniform depth for the full length of the rib 30 but, as illustrated in Fig. 10, it is flush with the unrelieved portion of the face of the die at the end where the rib 30 is of minimum height and gradually increases in depth to the opposite end. Thus the action of the groove- and shoulder-rolling ribs 30 of the two dies is exactly the same as the action of the thread-rolling ribs 31 in the respect that the metal forming the groove 25e and the shoulder 25d is displaced gradually from the start to about the middle of the thread-rolling operation from which point to the end of the thread-rolling operation the ribs 30 and 31 have a so-called ironing or smoothing action. It will be understood that with the screw illustrated in Figs. 8 and 9 the diameter of the unthreaded portion of the shank between the head and the shoulder 25d is the same as the diameter of the unthreaded portion between the groove 25e and the thread and the same as the external diameter of the threaded portion 25a.

Thus it will be seen that the objects of the invention stated in the early part of this specification are attained very effectively by this invention. Not only do I regard as new my improved process wherein the washer-retaining shoulder is rolled on the blank simultaneously with the rolling of the thread, but I regard as new also the resulting product, i. e., a screw having a rolled thread and having between the thread and the head of the screw either at the inner end of the thread or at any desired distance from the inner end of the thread a rolled washer-retaining shoulder, and I therefore aim in my claims to cover all modifications which do not involve a departure from the spirit and the scope of the invention in its broadest aspects.

Having thus described my invention, I claim:

1. The method of forming a screw adapted for a screw and washer assembly which comprises rolling a helical thread on a portion of a headed blank and in the same operation rolling a continuous annular washer-retaining shoulder on the blank, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

2. The method of forming a screw adapted for a screw and washer assembly which comprises rolling a helical thread on a portion of a headed blank and in the same operation rolling a continuous annular washer-retaining shoulder at the inner end of the thread, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

3. The method of forming a screw adapted for a screw and washer assembly which comprises rolling a helical thread on a portion of a headed blank and in the same operation rolling a continuous annular washer-retaining shoulder at any desired point between the inner end of the thread and the head of the blank, the rolling of the helical thread and annular shoulder being done prior to the application of the washer to the screw and the rolled shoulder being somewhat higher than the rolled thread so that after the screw is completed a washer may be moved over the thread and shoulder and retained between the shoulder and the head of the screw.

4. The method of forming a screw from a blank having a head, a portion of reduced diameter to be threaded, and a portion of larger diameter between the first named portion and the head and adapted to be left unthreaded, which comprises rolling a helical thread on the portion of reduced diameter and in the same operation forming a continuous annular shoulder on the portion of larger diameter, the rolling of the helical thread and annular shoulder being done prior to the application of the washer to the screw and said shoulder being sufficiently higher than the external diameter of the thread and of said portion of larger diameter that when a washer is passed over the thread and forced over the shoulder it will be retained by the latter between it and the head.

5. The method of forming a screw from a blank having a head and a shank with a portion of reduced diameter adapted to be threaded, a portion of larger diameter next to the head, and a tapered portion between the two first named portions, which comprises rolling a thread on the portion of reduced diameter and in the same operation rolling up the metal of the tapered portion so as to form a shoulder sufficiently higher than the external diameter of the thread and of the portion of the shank of larger diameter that a washer can be passed over the thread and forced over the shoulder and thereafter be retained between the shoulder and the head.

6. The method of forming a screw from a blank having a shank with a portion of reduced diameter adapted to be threaded and a portion of larger diameter between the first named portion and the head, which comprises rolling the thread on the portion of reduced diameter and at the same time rolling a groove in the portion of larger diameter and causing the metal displaced in forming the groove to produce a shoulder somewhat larger than the diameter of the larger portion of the shank so that a washer can be passed over the thread and forced over said shoulder to be retained by the latter between said shoulder and the head.

7. The method of making screw and washer assemblies which comprises rolling a helical thread on a headed blank and in the same operation rolling on the blank a continuous annular washer-retaining shoulder which is somewhat higher than the rolled thread, and then moving over the thread and shoulder a washer of a size to be retained on the screw between the shoulder and head thereof.

8. The method of making screw and washer assemblies which comprises rolling a helical thread on a portion of a headed blank and in the same operation rolling at the inner end of the thread a continuous annular washer-retaining shoulder which is somewhat higher than the rolled thread, and then moving over the thread and shoulder a washer of a size to be retained on the screw between the shoulder and head thereof.

9. The method of forming a screw from a blank having a head and a shank with a portion of reduced diameter adapted to be threaded, a portion of larger diameter next to the head, and a tapered portion between the two first named portions, which comprises rolling a thread on the portion of reduced diameter and in the same operation rolling up the metal of the tapered portion so as to form a shoulder somewhat higher than the rolled thread and said larger diameter portion of the shank, and then moving over the thread and shoulder a washer of a size to be retained on the screw between the shoulder and head thereof.

10. The method of forming a screw from a blank having a shank with a portion of reduced diameter adapted to be threaded and a portion of larger diameter between the first named portion and the head, which comprises rolling the thread on the portion of reduced diameter and at the same time rolling a groove in the portion of larger diameter and causing the metal displaced in forming the groove to produce a shoulder somewhat larger than the diameter of the larger portion of the shank, and then moving over the thread and shoulder a washer of a size to be retained on the screw between the shoulder and head thereof.

HARVEY C. ERDMAN.

DISCLAIMER 2,283,494.—*Harvey C. Erdman*, Shaker Heights, Ohio. METHOD OF MAKING SCREW AND WASHER ASSEMBLIES. Patent dated May 19, 1942. Disclaimer filed August 10, 1944, by the assignee, *The National Screw & Manufacturing Company*.

Hereby enters this disclaimer to claims 1, 2, 3, 4, 7, and 8 of said patent.

[*Official Gazette September 5, 1944.*]